(No Model.)
H. KELLER.
CULTIVATOR TOOTH.
No. 306,159. Patented Oct. 7, 1884.
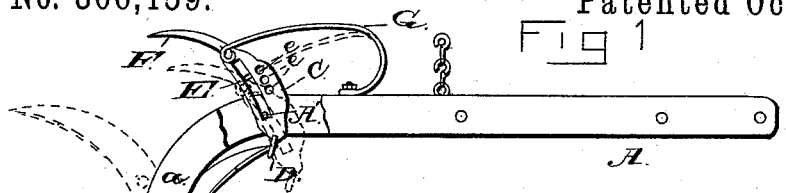
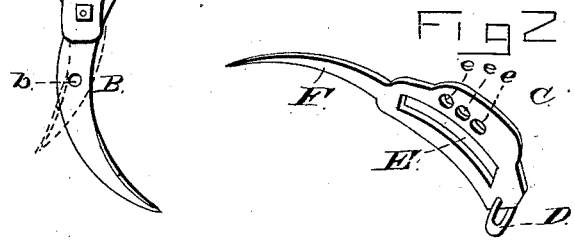
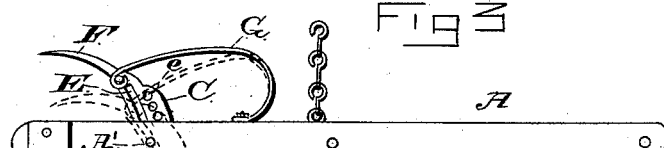
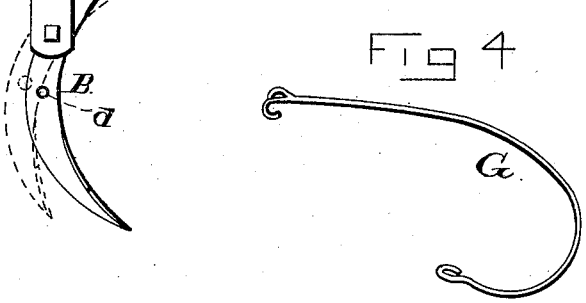
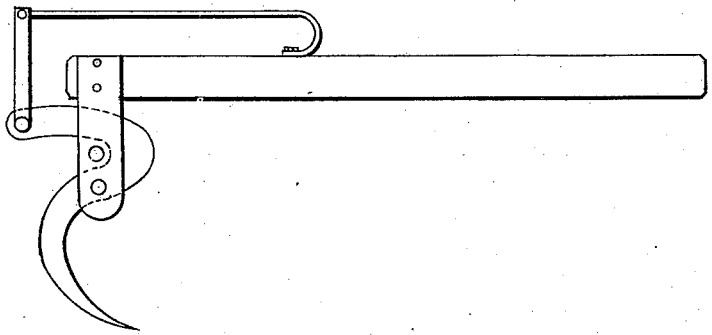
WITNESSES:
N. A. Clark.
P. B. Turpin,
INVENTOR:
Henry Keller
By R. S. & A. P. Lacey
Attys

UNITED STATES PATENT OFFICE.

HENRY KELLER, OF SAUK CENTRE, MINNESOTA.

CULTIVATOR-TOOTH.

SPECIFICATION forming part of Letters Patent No. 306,159, dated October 7, 1884.

Application filed June 7, 1884. (No model.)

*To all whom it may concern:*

Be it known that I, HENRY KELLER, a citizen of the United States, residing at Sauk Centre, in the county of Stearns and State of Minnesota, have invented certain new and useful Improvements in Cultivator-Teeth; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to cultivator-teeth; and it consists in the novel construction of parts hereinafter described, whereby the tooth is normally held in its operative position, and yet is permitted to yield in contact with stumps, rocks, or other obstructions.

In the drawings, Figure 1 is a side view of the drag-bar, tooth, &c. Fig. 2 is a detail perspective view of the latch or retaining bar. Fig. 3 is a view similar to Fig. 1, showing a modified form of drag-bar. Fig. 4 is a detail view of the preferred form of spring. Fig. 5 shows a modification, all of which will be described.

The drag-bar A is preferably formed of two metallic bars held slightly apart and having their rear ends, a, curved downward, as shown. The tooth B is preferably curved in the arc of a circle, and provided at both ends with shovels or points, so it may be reversed when desired. It is pivoted midway its ends on the lower end of the rear end of the drag-bar, and has one end extended down in operating position and its opposite end carried up into position to engage the retaining-bar, presently described. I provide said tooth with two pivot-holes, b, arranged equidistant from its opposite ends, as shown in Figs. 1 and 3. The latch-bar C is provided at its lower end with an eye or loop, D, and has formed through it a vertically-elongated slot, E, and it is arranged between the bars of the drag-bar and held thereto by a transverse pin, A', extended through the slot E, as will be understood from Figs. 1 and 3. The eye or loop D is preferably inclined rearward toward its lower end in order to more securely hold the upper end of the tooth. A handle extension, F, is extended from the upper end of the latch-bar, as shown. This handle serves as a suitable part to grasp when it is desired to raise the drag-bar. Perforations e are formed through the latch-bar in a series alongside the slot E, and are fitted to receive wooden or other suitable fragile pins, so as to hold the tooth, when desired, rigid, except when it strikes a stone, stump, or other unusual obstruction, in which case the pin breaks and the tooth yields, as indicated, sufficiently to permit it to escape over the obstruction, as will be understood from Fig. 1. When a yielding tooth is desired, it is only necessary to omit the pin, as will be appreciated. The spring G is preferably formed of an elastic rod bent normally into the form shown, and secured at one end on the drag-bar in advance of the latch-bar, and at its other end to said latch-bar at the head or upper end of the slot E. This spring gives the latch-bar upward tension and, incidentally, a tension to the rear, as will most clearly appear from Fig. 1.

While I prefer to form the drag-bar of two similar bars and to arrange the latch-bar between them, it is manifest the single bar could be used and slotted to receive the latch-bar, or said latch could be secured on the side of the bar; also, that instead of bending the rear end of the drag-bar to form the standard, the latter could be made separate and bolted or secured in other suitable manner to the drag-bar, as shown in Fig. 3. It is also obvious that the form and location of spring could be varied in many ways without involving a departure from the broad principles of my improvement, though I prefer the form shown and before described.

While I prefer to use the eye or loop D and form and incline it as shown, it will be understood that the latch could be recessed at its lower rear edge, or otherwise suitably formed to engage the point of the shovel.

When by reason of unusually large obstruction or it is desired to use the tooth as a smoothing-harrow, a slight depression of the upper end of the latch-bar will throw the lower or holding end of same forward, as indicated in dotted lines, Fig. 1, releasing the tooth. I find the handle F convenient in this releasing depression of the latch-bar, though said handle is intended especially for raising the drag-bar, as before described.

Instead of slotting the latch-bar it may be made with lateral studs entering corresponding slots in the drag-bar, so as to permit the vertical movement of the latch. I also prefer to form the latch-bar so that the tooth will not be detached when it strikes an obstruction, though by slight mechanical changes of the point of engagement of tooth and latch this detachment may be had. By the construction shown it will be appreciated the tooth when forced back by stone or stump will automatically resume its operating position when said obstruction is passed.

In Fig. 5 I show another mode of supporting a pivoted slip-tooth or arranging same in connection with a spring.

Having thus described my invention, what I claim, and desire to secure by Letters Patent, is—

1. The combination of the drag-bar, a spring-actuated latch-bar supported on the drag-bar and movable or vibrating in approximately a vertical line, and the tooth pivoted midway its length and having its upper end engaged with and normally held by the spring-latch, substantially as and for the purposes set forth.

2. The combination, with the drag-bar and the pivoted tooth, of the latch-bar adapted at its lower end to engage the tooth, and slotted longitudinally and provided with perforations fitted to receive fragile pins, and a spring connected with and actuating said latch, substantially as set forth.

3. The herein-described improvement in cultivators, consisting of the drag-bar, the tooth pivoted midway its ends to the drag-bar, and the vertically-vibrating spring-actuated latch having perforation fitted to receive a fragile pin, and provided with a handle extended from its upper end, substantially as set forth.

4. The combination of the beam, a tooth pivoted midway its ends thereto, and a spring-bar having one end secured to the beam, and its other end connected with upper end of the pivoted tooth, substantially as set forth.

In testimony whereof I affix my signature in presence of two witnesses.

HENRY KELLER.

Witnesses:
MATT SHIEFER,
W. P. LAMBERT.